United States Patent
Huang et al.

(10) Patent No.: US 9,210,705 B2
(45) Date of Patent: Dec. 8, 2015

(54) METHOD AND DEVICE FOR DATA TRANSMISSION

(71) Applicant: Huawei Technologies Co., Ltd., Shenzhen, Guangdong (CN)

(72) Inventors: Qufang Huang, Shenzhen (CN); Wenji Liu, Shenzhen (CN); Yi Guo, Shenzhen (CN); Wen Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 14/012,628

(22) Filed: Aug. 28, 2013

(65) Prior Publication Data

US 2013/0343362 A1 Dec. 26, 2013

Related U.S. Application Data

(63) Continuation of application No. PCT/CN2012/071688, filed on Feb. 28, 2012.

(30) Foreign Application Priority Data

Feb. 28, 2011 (CN) .......................... 2011 1 0049823

(51) Int. Cl.
*H04J 3/00* (2006.01)
*H04W 72/04* (2009.01)
(Continued)

(52) U.S. Cl.
CPC .......... *H04W 72/0446* (2013.01); *H04W 4/005* (2013.01); *H04W 72/04* (2013.01); *H04W 68/00* (2013.01)

(58) Field of Classification Search
None
See application file for complete search history.

(56) References Cited

U.S. PATENT DOCUMENTS

| 2009/0186613 A1 | 7/2009 | Ahn et al. |
| 2010/0014468 A1 | 1/2010 | Lee et al. |

(Continued)

FOREIGN PATENT DOCUMENTS

| CN | 101534552 A | 9/2009 |
| CN | 101772180 A | 7/2010 |

(Continued)

OTHER PUBLICATIONS

"3GPP TS 36.213—$3^{rd}$ Generation Partnership Project; Technical Specification Group Radio Access Network; Evolved Universal Terrestrial Radio Access (E-UTRA); Physical layer procedures (Release 9)," Mar. 2010, Version 9.1.0, $3^{rd}$ Generation Partnership Project, Valbonne, France.

(Continued)

*Primary Examiner* — Willie J Daniel, Jr.
(74) *Attorney, Agent, or Firm* — Leydig, Voit & Mayer, Ltd.

(57) ABSTRACT

A method for data transmission, comprising: receiving, by a device, a paging message, and determining an opportunity for acquiring an uplink transmission resource, by basing on a subframe for receiving the paging message; acquiring, by the device, an uplink transmission resource at the opportunity for acquiring the uplink transmission resource; and reporting, by the device, user data in the uplink transmission resource, by using a time advance that is stored in the device itself and that corresponds to a current position. According to the embodiments of the present invention, no random access is required when the MTC device transmits uplink data, and no RRC connection or user plane bearer is to be established, which greatly simplifies the procedures of data transmission for the device, and the device can quickly and high-efficiently transmit uplink data, thereby improving the transmission efficiency, and reducing the signaling load of the base station.

8 Claims, 4 Drawing Sheets

(51) Int. Cl.
*H04W 4/00* (2009.01)
*H04W 68/00* (2009.01)

(56) References Cited

U.S. PATENT DOCUMENTS

2010/0214969 A1* 8/2010 Lamm et al. .................. 370/311
2012/0093102 A1 4/2012 Zhang et al.
2012/0096154 A1 4/2012 Chen et al.

FOREIGN PATENT DOCUMENTS

| CN | 101911543 A | 12/2010 |
| CN | 101931859 A | 12/2010 |
| CN | 101931931 A | 12/2010 |

OTHER PUBLICATIONS

"3GPP TSG RAN WG2 Meeting #69—Consideration on Paging for MTC device," Feb. 2010, Agenda item 4.3.2, 3$^{rd}$ Generation Partnership Project, Valbonne, France.

"3GPP TSG RAN WG2 Meeting #70—Paging and downlink transmission for MTC," May 2010, Agenda item 4.3.2, 3$^{rd}$ Generation Partnership Project, Valbonne, France.

"3GPP TSG-RAN WG3 Meeting #69—Consideration on MTC Device Indication," Aug. 2010, Agenda item 22, 3$^{rd}$ Generation Partnership Project, Valbonne, France.

"3GPP TSG SA WG2 Meeting #78—Key Issue—Offline Small Data Transmisison," Feb. 2010, Agenda item 9.7, 3$^{rd}$ Generation Partnership Project, Valbonne, France.

"3GPP TR 23.888—3$^{rd}$ Generation Partnership Project; Technical Specification Group Services and System Aspects; System Improvements for Machine-Type Communications (Release 10)," Jul. 2010, Version 1.0.0, 3$^{rd}$ Generation Partnership Project, Valbonne, France.

"3GPP TSG-RAN WG2 Meeting #70bis—RAN overload control solutions," Jul. 2010, Agenda item 4.3.2.1, 3$^{rd}$ Generation Partnership Project, Valbonne, France.

"3GPP TR 37.868—3$^{rd}$ Generation Partnership Project; Technical Specification Group Radio Access Network; Study on RAN Improvements for Machine-type Communications (Release 10)," Oct. 2010, Version 0.7.0, 3$^{rd}$ Generation Partnership Project, Valbonne, France.

* cited by examiner

METHOD AND DEVICE FOR DATA TRANSMISSION

CROSS-REFERENCE TO RELATED APPLICATIONS

This application is a continuation of International Patent Application No. PCT/CN2012/071688, filed on Feb. 28, 2012, which claims priority to Chinese Patent Application No. 201110049823.X, filed on Feb. 28, 2011, both of which are hereby incorporated by reference in their entireties.

TECHNICAL FIELD

This invention relates to the field of communication technologies, and particularly, to a method and a device for data transmission.

BACKGROUND

The Machine-to-Machine (M2M) technology realizes direct communications between machines, for the objective of enabling all the machines to have the networking and communication capabilities. Thus the M2M technology has a very important significance, with broad markets and wide applications.

Currently, most of the M2M devices are fixed and will not be moved frequently. The communication traffic is not high, and the number of times of data transmissions is not large. For devices such as electric meter and water meter, the data only needs to be reported once a month through the wireless network, and the data transmission amount is also very small each time. However, the absolute quantity of the M2M devices is too large, and how to manage the communications between so many M2M devices and the wireless network is one of the problems to be solved at present.

Currently, the mechanism of communications between the M2M and the wireless network may be classified into Push and Pull. The Push mechanism means that the M2M terminal actively initiates a communication with the network side and reports data. The Pull mechanism means that the network side actively initiates a communication, and requires the M2M terminal to report data. In the two basic communication modes, when the Pull mechanism is adopted, the wireless network side can effectively control the communication traffic and prevent the congestion caused by a lot of terminals accessing the network simultaneously. Thus the Pull mechanism becomes the main communication mode of M2M.

When the Machine Type Communications (MTC) application server needs to collect data, it sends "Pull request" to the access network. Herein many types of network elements may be interacted with the MTC application server, and finally the request will be sent to a base station which notifies the MTC device to report data.

Figure 1:
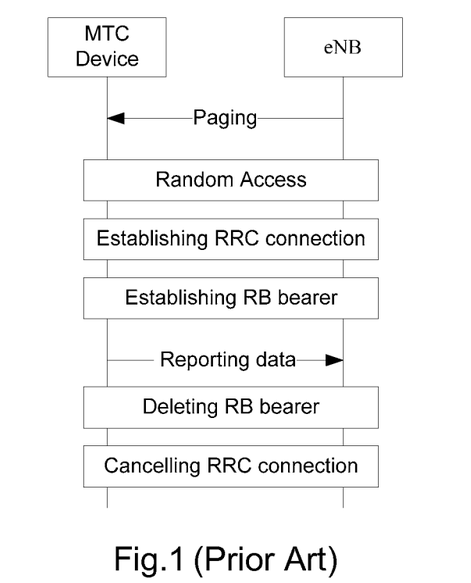
FIG. 1 is a flowchart in the prior art where an MTC device reports data.

As illustrated in FIG. 1, according to existing Long Term Evolution (LTE) communication procedures, the MTC device is in the IDLE (idle) state at ordinary times, and when an eNB needs to request the MTC device to upload data, it sends a paging message to the MTC device. After receiving the paging message, the MTC device initiates a random access to establish a Radio Resources Control (RRC) connection and a data bearer, then transmits user information through the data bearer, cancels the bearer and deletes the RRC connection.

The prior art at least has the following deficiencies: Although the MTC device reports very little data each time, it still requires the whole procedures for establishing connection and bearer. Thus, the data volume of signaling occupies a very large proportion in the data volume of all the air-interface communications, and the transmission efficiency is low.

In addition, since there are a large number of MTC devices and each MTC device makes a random access, a lot of random access resources are occupied, thus the probability of collision in the random accesses increases, and the communication experiences of other normal terminals will be influenced.

SUMMARY

The embodiments of the present invention provide a method and a device for data transmission, so that the device can quickly and high-efficiently transmits uplink data, thereby improving the transmission efficiency, and reducing the signaling load of the base station.

The embodiments of the present invention are implemented through the following technical solutions:

In one aspect, the embodiment of the present invention provides a method for data transmission, comprising: receiving, by a device, a paging message, and determining an opportunity for acquiring an uplink transmission resource, by basing on a subframe for receiving the paging message; acquiring, by the device, an uplink transmission resource at the opportunity for acquiring uplink transmission resource; and reporting, by the device, user data in the uplink transmission resource, by using a time advance that is stored in the device itself and that corresponds to a current position.

In another aspect, the embodiment of the present invention provides a device for data transmission, comprising: a reception unit configured to receive a paging message; an opportunity determination unit configured to determine an opportunity for acquiring uplink transmission resource, by basing on a subframe for the reception unit receiving the paging message; an acquisition unit configured to acquire the uplink transmission resource at the opportunity determined by the opportunity determination unit; and a data transmission unit configured to report user data in the uplink transmission resource acquired by the acquisition unit, by using a time advance that is store in the device itself and that corresponds to a current position.

As can be seen from the technical solutions provided by the embodiments of the present invention, in the embodiments of the present invention, no random access is required when the MTC device transmits uplink data, and no RRC connection or user plane bearer is to be established, which greatly simplifies the procedures of data transmission for the device, and the device can quickly and high-efficiently transmit uplink data, thereby improving the transmission efficiency, and reducing the signaling load of the base station.

DESCRIPTION OF EMBODIMENTS

The technical solutions of the embodiments of the present invention will be clearly and completely described as follows with reference to the drawings. It shall be appreciated that those described herein are just parts of the embodiments of the present invention rather than all the embodiments. Based on the embodiments of the present invention, any other embodiment obtained by a person skilled in the art without paying any creative effort shall fall within the protection scope of the present invention.

Embodiment 1

Figure 2:
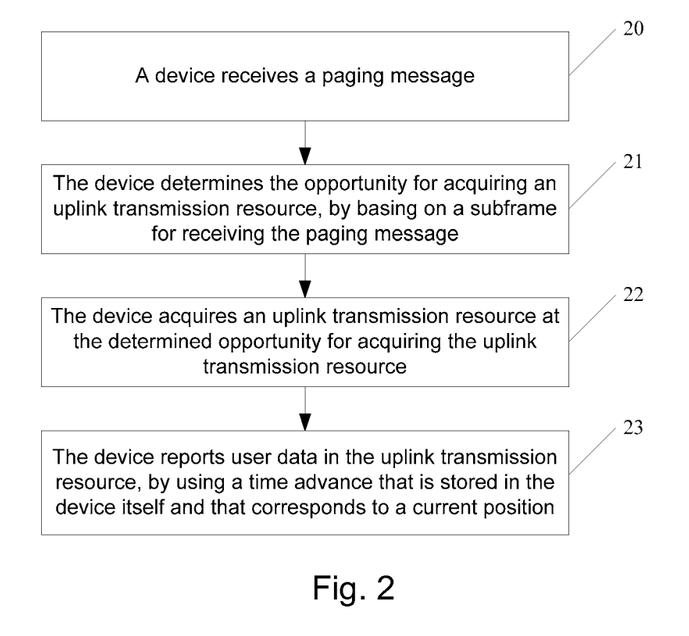
FIG. 2 is a flowchart of a method for data transmission according to Embodiment 1 of the present invention.

The embodiment 1 of the present invention provides a method for data transmission. As illustrated in FIG. 2, the method includes the contents as follow.

20: a device receives a paging message.

When a base station needs to trigger the device to report user data, the base station sends the device a paging message including a list of terminals to be paged.

21: the device determines an opportunity for acquiring an uplink transmission resource, by basing on a subframe for receiving the paging message.

In which, by basing on the subframe for receiving the paging message, determining the opportunity for acquiring uplink transmission resource includes:

1) When the device is an MTC device, the opportunity for acquiring the uplink transmission resource=a subframe of the paging message or a subframe indicated by the paging message+a fixed offset+K*an index number of the MTC device in a paging list. In that case, the uplink transmission resource is an uplink transmission allocated to the device by the base station.

In which, K is the number of subframes spaced between uplink schedules of two MTC devices. For example, the opportunity for allocating the uplink transmission resource to the first target UE is the subframe of the paging message or the subframe indicated by the paging message+the fixed offset; the opportunity for allocating the uplink transmission resource to the second target UE is the subframe of the paging message or the subframe indicated by the paging message+ the fixed offset+K* the index number of the MTC device in the paging list; the opportunity for allocating the uplink transmission resource to the third target UE is the subframe of the paging message or the subframe indicated by the paging message+the fixed offset+2K * the index number of the MTC device in the paging list.

The value of the fixed offset and the value of K may be specified in the protocol or configured by the upper layer signaling, and they are not limited herein.

The subframe indicated by the paging message is a certain subframe that can be calculated from the subframe where the paging message is located.

2) Each device in a same paging group bases on the subframe for receiving the paging message, and takes an opportunity after a fixed interval as the opportunity for acquiring the uplink transmission resource. In that case, the uplink transmission resource is an uplink transmission resource allocated to the paging group by the base station. The interval may be specified in the protocol or configured by the upper layer signaling, and it is not limited herein. That is, the base station allocates an identical uplink transmission resource to each device in the same paging group.

3) Determining a start position of a time window for acquiring the uplink transmission resource. When the device is an MTC device, the start position of the time window=a subframe of the paging message or a subframe indicated by the paging message+a fixed offset+a window size * the index number of the MTC device in the paging list. A time beginning from the start position in the time window is the opportunity for acquiring the uplink transmission resource. In that case, the uplink transmission resource is an uplink transmission resource allocated to the device by the base station. That is, from the start point of the time window, the device begins to detect the uplink transmission resource transmitted from the base station, until the time window ends up.

In which, the fixed offset and the window size may be specified in the protocol or configured by the upper layer signaling, and they are not limited herein.

22: the device acquires an uplink transmission resource at the determined opportunity for acquiring the uplink transmission resource.

When the device is in the IDLE state, it identifies and acquires the uplink transmission resource with a uniform Radio Network Temporary Identifier (RNTI). The uniform RNTI may be used by the devices in one paging group or by all the devices. The device may acquire the uniform RNTI through a broadcast message or a dedicated signaling. The uniform RNTI may be specified in the protocol or configured by the upper layer signaling, and it is not limited herein.

In which, in step 21, when each device in the same paging group bases on the subframe for receiving the paging message and takes an opportunity after a fixed interval as the opportunity for acquiring the uplink transmission resource. That is to say, the base station uniformly schedules each device, and each device separately calculates its opportunity for uploading user data, i.e., each device calculates an uplink transmission subframe, after acquiring the uplink transmission resource allocated to the paging group by the base station at the determined opportunity. The specific calculation method may be:

when the device is an MTC device, the uplink transmission subframe corresponding to the device=a subframe for acquiring the uplink transmission resource+a fixed offset+N* an index number of the MTC device in a paging list. In which, N is the number of subframes spaced between uplink schedules of two MTC devices. For example, the opportunity for allocating an uplink transmission resource to the first target UE is the subframe of the paging message or the subframe indicated by the paging message+the fixed offset; the opportunity for allocating an uplink transmission resource to the second target UE is the subframe of the paging message or the subframe indicated by the paging message+the fixed offset+N* the index number of the MTC device in the paging list; the opportunity for allocating an uplink transmission resource to the third target UE is the subframe of the paging message or the subframe indicated by the paging message+the fixed offset+2N * the index number of the MTC device in the paging list.

The value of the fixed offset and the value of N may be specified in the protocol or configured by the upper layer signaling, and they are not limited herein. The fixed offset in the calculation equation and the fixed offset in the equation of calculating the opportunity for acquiring the uplink transmission resource may be independent from each other, and their values may have no association.

23: the device reports the user data in the uplink transmission resource, by using a time advance that is stored in the device itself and that corresponds to a current position.

The device reports the user data in the uplink transmission resource, by using the time advance that is stored in the device itself and that corresponds to the current position includes: the device judges whether a position change thereof after the time advance is acquired last time exceeds a predetermined threshold, and if not, the device reports the user data in the uplink transmission resource, by using the time advance that is stored in the device itself and that corresponds to the current position. Optionally, when the position change of the device after the time advance is acquired last time exceeds the predetermined threshold, the user data will be not uploaded. As an optional implementation, when the device does not upload the user data, the device may initiate a random access process.

In which, the method that the device judge whether the position change thereof after the time advance is acquired last time exceeds the predetermined threshold may include: the device sets a clock by itself, and calculates a boundary of a downlink subframe according to the clock each time a new time advance is acquired; obtains a deviation by comparing a boundary of the downlink subframe actually received with the calculated boundary of the downlink subframe according to the set clock; and judges whether the position change thereof exceeds the predetermined threshold according to the deviation. The boundary of the downlink subframe actually received is the boundary of the downlink subframe where the device acquires the uplink transmission resource.

In the solution of the embodiment of the present invention, no random access is required when the device transmits uplink data, and no RRC connection or user plane bearer is to be established, which greatly simplifies the procedures of data transmission for the device, and the device can quickly and high-efficiently transmit uplink data, thereby improving the transmission efficiency, and reducing the signaling load of the base station.

In order to further understand the present invention, the method in Embodiment 1 of the present invention is described in detail as follows through specific examples.

EXAMPLE 1

Figure 3:
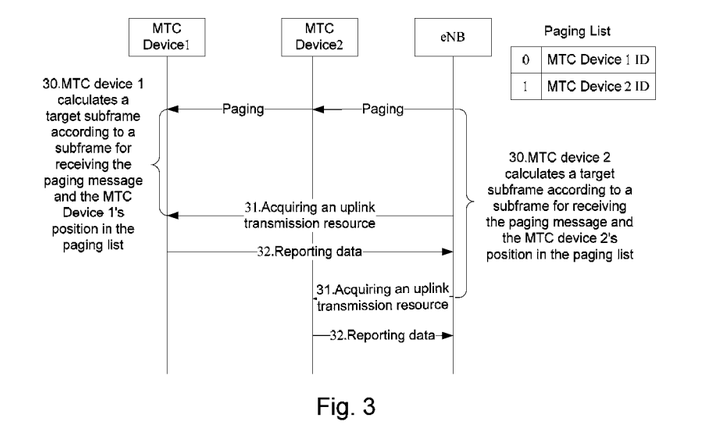
FIG. 3 is a flowchart where an MTC device reports data according to Example 1 of the present invention.

Scenario: the eNB needs to trigger a group of MTC devices to report data, and it sends a paging message at a certain paging time. In this example, the paging message includes a list of two MTC devices (MTC device 1 and MTC device 2), and the procedures for the MTC device to report data are illustrated in FIG. 3, including:

30: after receiving the paging message, each MTC device calculates each MTC device's target subframe respectively according to the subframe for receiving the paging message and each MTC device's position in the paging list, i.e., determines an opportunity for an acquiring uplink transmission resource.

In the embodiment, the method that the MTC device determines the opportunity for acquiring the uplink transmission resource include: basing on the subframe where the paging message is located, adding a fixed value, and determining the opportunity according to the position of each MTC device in the paging list, etc. For example, the following equation may be used: the opportunity for acquiring the uplink transmission resource=a subframe of the paging message/a subframe indicated by the paging message+a fixed offset+K * an index number of the MTC device in a paging list.

In which, K is the number of subframes spaced between the uplink schedules of two MTC devices. The value of the fixed offset and the value of K may be specified in the protocol or configured by the upper layer signaling. For example, when MTC device 2 in FIG. 3 has an index number 1 in the paging list, the opportunity for acquiring the uplink transmission resource can be determined: the opportunity for acquiring uplink transmission resource=a subframe of the paging message+a fixed offset+K *1.

31: each MTC device receives a Physical Downlink Control Channel (PDCCH) signal from the eNB in target subframe calculated by each MTC device itself, and analyzes the PDCCH signal to obtain each device's uplink transmission resource.

Since MTC devices are in the IDLE state under which the terminal has no RNTI, the base station may adopt a uniform RNTI to schedule the MTC devices in the IDLE state. The uniform RNTI may be specified in the protocol or configured by the upper layer signaling, and notified to the MTC device through broadcasting or dedicated signaling.

32: each MTC device reports data in corresponding uplink transmission resource, by using a current position's Time Advanced (TA) value that is stored in each MTC device itself.

After acquiring the uplink transmission resource, the MTC device judges whether the position change thereof exceeds a predetermined threshold after a TA value is acquired last time; if yes, no uplink data is uploaded; and if not, the MTC device reports data in corresponding uplink transmission resource using the currently stored TA value. The specific method for reporting data in the determined uplink transmission resource using the TA value may be implemented through the prior art.

In which, the MTC device may judge whether the position change thereof exceeds the predetermined threshold by using the offset of the received boundary of the downlink subframe. For example, the MTC device sets a clock, and calculates the boundary of a downlink subframe by the MTC device itself; obtains a deviation by comparing the boundary of the downlink subframe actually received and the calculated boundary of the downlink subframe according to the set clock; and judges whether the position change thereof exceeds the predetermined threshold according to the deviation.

In the embodiment of the present invention, after the MTC device receives the paging message, no RRC connection or bearer is to be established, and the uplink transmission resource is directly allocated to send the uplink message, thereby greatly simplifying the procedures of data transmission for the device. Since the MTC device does not need to establish an RRC connection, no random access is required, thereby saving the random access resources, and other devices may achieve a higher success rate of access.

EXAMPLE 2

Figure 4:
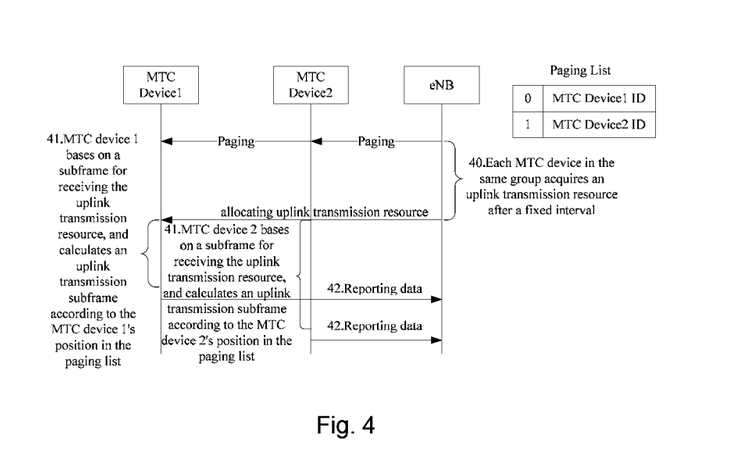
FIG. 4 is a flowchart where an MTC device reports data according to Example 2 of the present invention.

The eNB needs to trigger a group of MTC devices to report data, and the eNB sends a paging message at a certain paging time. In this example, the paging message includes a list of two terminals (MTC device 1 and MTC device 2). In order to save the PDCCH resources and simplify the air-interface message, this example adopts a method of one scheduling and multiple transmissions. As illustrated in FIG. 4, the procedures for the MTC device to report data include the contents as follows:

40: when finding that it is in the paging list after receiving the paging message, the MTC device takes the subframe of the paging message as the reference, and acquires a PDCCH message of the base station after a fixed interval, so as to acquire the uplink transmission resource. That is, the MTC device takes the subframe of the paging message as the reference, and employs the opportunity after a fixed interval as the opportunity for acquiring the uplink transmission resource.

The fixed interval may be specified in the protocol or configured by the upper layer signaling. The MTC devices in the same paging group may use the same interval.

Since the MTC devices are in the IDLE state under which the terminal has no RNTI, the base station may adopt a uniform RNTI to schedule the MTC devices in the IDLE state. The uniform RNTI may be specified in the protocol or configured by the upper layer signaling, and notified to the MTC device through broadcasting or dedicated signaling.

Through the method of this example, the PDCCH load may be reduced, and the eNB uniformly issues the uplink transmission resource.

41: after acquiring the uplink transmission resource, each MTC device bases on the subframe for receiving the uplink transmission resource and calculates a corresponding uplink transmission subframe according to each MTC device's position in the paging list, i.e., determines an opportunity for uploading user data.

The calculation equation is that the uplink transmission subframe=a subframe for receiving the uplink transmission resource+a fixed offset+N * the index number of the MTC device in the paging list.

In the equation, N is the number of subframes spaced between two uplink transmission resources; the fixed offset and the value of N may be specified in the protocol or configured by the upper layer signaling. For example, MTC device 1 in FIG. 4 has an index 0 in the paging list, and the uplink transmission subframe calculated on this basis is: the uplink transmission subframe=a subframe for receiving the uplink transmission resource+a fixed offset. MTC device 2 has an index 1 in the paging list, and the uplink transmission subframe calculated on this basis is: the uplink transmission subframe=a subframe for receiving the uplink transmission resource+a fixed offset+K.

42: each MTC device reports data in corresponding uplink transmission resource using a current position's TA value stored in each MTC device itself.

The specific operation of this step is the same as that of step 32 in Example 1, and herein is omitted.

In the embodiment of the present invention, after the MTC device receives the paging message, no RRC connection or bearer is to be established, and the uplink transmission resource is directly allocated to send the uplink message, thereby greatly simplifying the procedures of data transmission for the device. Since the MTC device does not need to establish an RRC connection, no random access is required, thereby saving the random access resources, and other devices may achieve a higher success rate of access.

EXAMPLE 3

Figure 5:
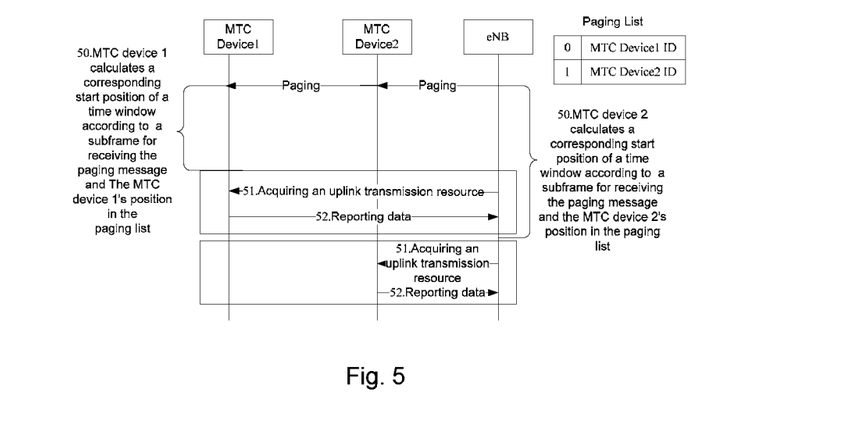
FIG. 5 is a flowchart where an MTC device reports data according to Example 3 of the present invention.

The eNB needs to trigger a group of MTC devices to report data, and the eNB sends a paging message at a certain paging time. In this example, the paging message includes a list of two terminals (MTC device 1 and MTC device 2). As illustrated in FIG. 5, the procedures for the MTC device to report data include the contents as follows:

50: when the MTC device has found that the MTC device itself is in the paging list after receiving the paging message, the MTC device calculates a corresponding start position of a time window according to a subframe for receiving the paging message and the MTC device's position in the paging list.

The specific equation is that the start point of the time window=a subframe of the paging message or a subframe indicated by the paging message+a fixed offset+the index number of the MTC device in the paging list * a window size.

For example, MTC device 1 in FIG. 5 has an index number 0 in the paging list, and its calculated start point of the time window is "the subframe of the paging message+the fixed offset"; and MTC device 2 has an index number 1 in the paging list, and the MTC Device 2's calculated start point of the time window is "the subframe of the paging message+the fixed offset+the window size". The dotted box in FIG. 5 is the time window corresponding to MTC device 1, and the solid box is the time window corresponding to MTC device 2.

The fixed offset and the window size in the equation may be specified in the protocol or configured by the upper layer signaling.

51: from the calculated start point of the time window, the MTC device begins to detect the PDCCH transmitted from the base station in the time window, so as to acquire an uplink transmission resource allocated to the MTC Device by the base station.

In this procedure, the MTC device uses the dedicated RNTI to identify the uplink transmission resource allocated to the MTC device by the network. The RNTI may be shared by one group of MTC devices or by all the MTC devices, and the specific value of RNTI may be specified in the protocol or configured by the upper layer signaling.

52: each MTC device reports data in corresponding uplink transmission resource, by using a current position's TA value stored in each MTC device itself.

The specific operation of this step is the same as that of step 32 in Example 1, and herein is omitted.

In the solution of the Example, the base station may schedule the MTC device in corresponding window, and the base station can select a relatively idle subframe, thus a certain flexibility is available.

In the embodiment of the present invention, after the MTC device receives the paging message, no RRC connection or bearer is to be established, and the uplink transmission resource is directly allocated to send the uplink message, thereby greatly simplifying the procedures of data transmission for the device. Since the MTC device does not need to establish an RRC connection, no random access is required, thereby saving the random access resources, and other devices may achieve a higher success rate of access.

Embodiment 2

Figure 6:
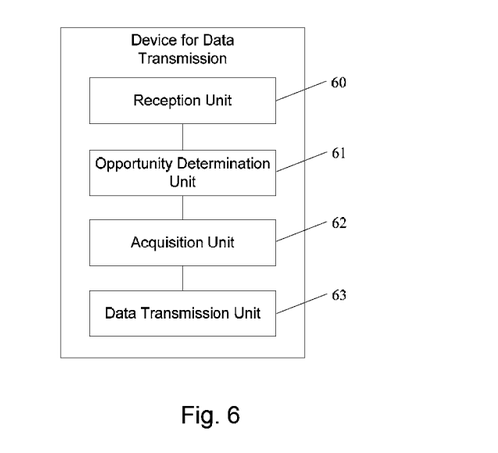
FIG. 6 is a structure diagram of the device according to Embodiment 2 of the present invention.

The embodiment provides a device for data transmission, which is corresponding to the method in Embodiment 1. As illustrated in FIG. 6, the device includes a reception unit 60, an opportunity determination unit 61, an acquisition unit 62 and a data transmission unit 63.

In which, the reception unit 60 receives a paging message; the opportunity determination unit 61 determines an opportunity for acquiring an uplink transmission resource, by basing on a subframe for the reception unit 60 receiving the paging message; the acquisition unit 62 acquires the uplink transmission resource at the opportunity for acquiring the uplink transmission resource determined by the opportunity determination unit 61; and the data transmission unit 63 reports user data in the uplink transmission resource acquired by the acquisition unit 62, by using a time advance that is stored in the device itself and that corresponds to a current position Specifically, the opportunity determination unit 61 determines the opportunity for acquiring the uplink transmission resource in the following method:

1) When the device is an MTC device, the opportunity for acquiring the uplink transmission resource=a subframe of the paging message or a subframe indicated by the paging message+a fixed offset+K* an index number of the MTC device in a paging list. In that case, the uplink transmission resource is that allocated to the device by the base station. In which, K is the number of subframes spaced between the uplink schedules of two MTC devices. The value of the fixed offset and the value of K may be specified in the protocol or configured by the upper layer signaling, and they are not limited herein.

The subframe indicated by the paging message is a certain subframe that can be calculated from the subframe where the paging message is located.

2) Each device in a same paging group bases on the subframe for receiving the paging message, and takes an opportunity after a fixed interval as the opportunity for acquiring uplink transmission resource. In that case, the uplink transmission resource is that allocated to the paging group by the base station. The interval may be specified in the protocol or configured by the upper layer signaling, and it is not limited herein. That is, the base station allocates the identical uplink transmission resource to each device in the same paging group.

3) Determining a start position of a time window for acquiring an uplink transmission resource. When the device is an MTC device, the start position of the time window=a subframe of the paging message or a subframe indicated by the paging message+a fixed offset+a window size * the index number of the MTC device in the paging list. The time beginning from the start position in the time window is the opportunity for acquiring the uplink transmission resource. In that case, the uplink transmission resource is an uplink transmission resource allocated to the device by the base station. That is, from the start point of the time window, the device begins to detect the uplink transmission resource transmitted from the base station, until the time window ends up.

In which, the fixed offset and the window size may be specified in the protocol or configured by the upper layer signaling, and they are not limited herein.

Figure 7:
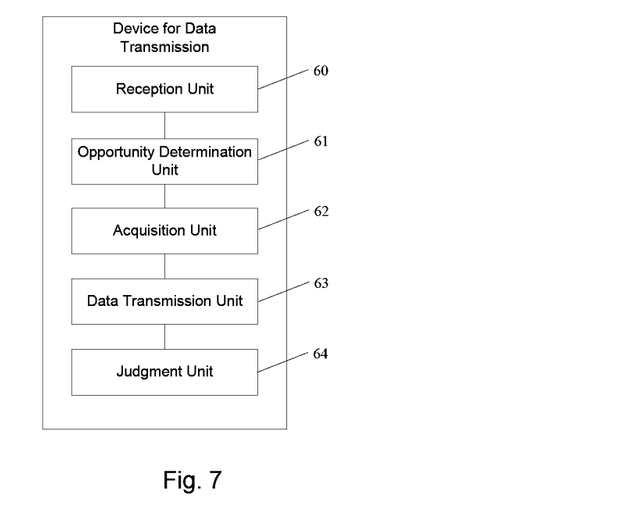
FIG. 7 is another structure diagram of the device according to Embodiment 2 of the present invention.

Optionally, as illustrated in FIG. 7, the device further includes a judgment unit 64 configured to judge whether a position change of the device after the time advance is acquired last time exceeds a predetermined threshold; if not, the data transmission unit 63 reports the user data in the uplink transmission resource, by using the time advance that is stored in the device itself and that corresponds to current position; and if yes, the user data will be not uploaded by the data transmission unit 63.

Figure 8:
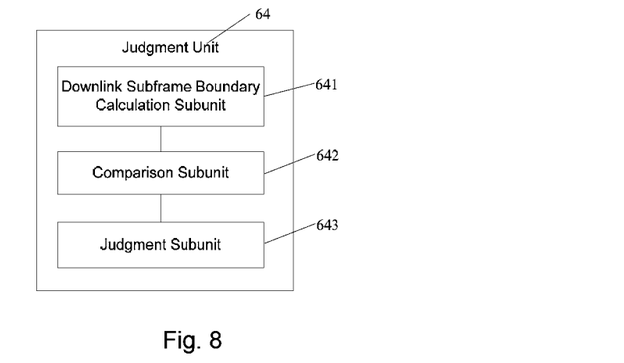
FIG. 8 is a structure diagram of a judging unit in the device according to Embodiment 2 of the present invention.

Optionally, as illustrated in FIG. 8, the judgment unit 64 may further include a downlink subframe boundary calculation subunit 641, a comparison subunit 642 and a judgment subunit 643.

In which, the downlink subframe, boundary calculation subunit 641 calculates the boundary of a downlink subframe according to a clock set by the device; the comparison subunit 642 obtains a deviation by comparing the boundary of the downlink subframe actually received by the device with the calculated boundary of the downlink subframe by the device according to the set clock; and the judgment subunit 643 calculates whether the position change of the device exceeds the predetermined threshold according to the deviation, so as to judge whether the currently stored time advance is available.

In the solution of the embodiment, no random access is required when the MTC device transmits uplink data, and no RRC connection or user plane bearer is to be established, which greatly simplifies the procedures of data transmission for the device, and the device can quickly and high-efficiently transmit uplink data, thereby improving the transmission efficiency, and reducing the signaling load of the base station In conclusion, in the embodiments of the present invention, no random access is required when the MTC device transmits uplink data, and no RRC connection or user plane bearer is to be established, which greatly simplifies the procedures of data transmission for the device, and the device can quickly and high-efficiently transmit uplink data, thereby improving the transmission efficiency, and reducing the signaling load of the base station.

A person skilled in the art will appreciate that all or a part of the steps of the methods in the above embodiments may be accomplished by instructing relevant hardware through a program that may be stored in a computer readable storage medium, such as Read Only Memory (ROM), Random Access Memory (RAM), magnetic disk, optical disk, etc.

The above descriptions are just preferred embodiments of the present invention, and the protection scope of the present invention is not limited thereto. Any change or replacement that can be easily conceived by a person skilled in the art within the technical scope disclosed by the present invention shall fall within the protection scope of the present invention. Therefore, the protection scope of the present invention shall be determined by the protection scope of the claims.

What is claimed is:

1. A method for data transmission, comprising:

receiving, by a device, a paging message;

determining, by the device, a time window for acquiring an uplink transmission resource based on a subframe for receiving the paging message;

acquiring, by the device, the uplink transmission resource at the time window for acquiring the uplink transmission resource; and reporting, by the device, user data in the uplink transmission resource, by using a time advance value that is stored in the device and that corresponds to a current position value, wherein when the uplink transmission resource is allocated to the device by a base station and the device is a Machine Type Communications (MTC) device, determining, by the MTC device, the time window for acquiring the unlink transmission resource based on the subframe for receiving the paging message comprises determining that the time window for acquiring the uplink transmission resource is based on summing a subframe of the paging message or a subframe indicated by the paging message, a fixed offset, and a multiple of an index number of the MTC device in a paging list, wherein the multiple is a number of subframes spaced between uplink schedules of two MTC devices; or wherein when the device is a device in a paging group, and the uplink transmission resource is allocated to the paging group by a base station, determining, by the device, the time window for aquiring the uplink transmission resource based on the subframe for receiving the paging message comprises identifying a time window after a fixed interval as the time window for acquiring the uplink transmission resource; or wherein determining, by the device, the time window for acquiring the uplink transmission resource, comprises: determining, by the device, a start position of the time window for acquiring the uplink transmission resource; wherein the device is an MTC device; wherein the start position of the time window is based on summing a subframe of the paging message or a subframe indicated by the paging message, a fixed offset, and a size of the time window multiplied by an index number of the MTC device in an paging list; and wherein the uplink transmission resource is an uplink transmission resource allocated to the MTC device by a base station.

2. The method according to claim 1, wherein the device is a Machine Type Communications (MTC) device, and wherein, when the device is the device in the paging group, and the uplink transmission resource is allocated to the paging group by the base station, and when determining, by the device, the time window for acquiring the uplink transmission resource based on the subframe for receiving the paging message comprises identifying the time window after the fixed interval as the time window for acquiring the uplink transmission resource, after acquiring, by the device, the uplink transmission resource at the time window for acquiring the uplink transmission resource, the method further comprises:
calculating, by the device, an uplink transmission subframe corresponding to the MTC device according to a subframe for acquiring the uplink transmission resource;
calculating the uplink transmission subframe corresponding to the MTC device according to the subframe for acquiring the uplink transmission resource based on summing the subframe for acquiring the uplink transmission resource, a fixed offset, and a multiple of an index number of the MTC device in a paging list;
wherein the multiple is multiple number of subframes spaced between uplink schedules of two MTC devices.

3. The method according to claim 1, wherein when the device is in an IDLE state, and acquiring, by the device, the uplink transmission resource at the time window for acquiring the uplink transmission resource, comprises:
acquiring, by the device, a uniform Radio Network Temporary Identifier (RNTI) through a broadcast message or a dedicated signaling; and
acquiring, by the device, the uplink transmission resource, by using the uniform RNTI.

4. The method according to claim 1, wherein reporting, by the device, the user data in the uplink transmission resource, by using the time advance value that is stored in the device and that corresponds to the current position value, comprises:
judging, by the device, whether a position change of the device after a time advance value has elapsed exceeds a predetermined threshold; and
if the position change of the device after the time advance value has elapsed does not exceed the predetermined threshold, then reporting, by the device, the user data in the uplink transmission resource, by using the time advance value that is stored in the device and that corresponds to the current position value.

5. The method according to claim 4, wherein judging, by the device, whether the position change of the device after the time advance value has elapsed exceeds the predetermined threshold, comprises:
calculating, by the device, a boundary of a downlink subframe according to a clock set by the device;
obtaining, by the device, a deviation by comparing a boundary of the downlink subframe actually acquired by the device with the calculated boundary of the downlink subframe according to the clock set by the device; and
calculating, by the device, whether the position change exceeds the predetermined threshold according to the deviation.

6. A device for data transmission, comprising:
a receiver unit, configured to receive a paging message; and
a processor, configured to:
determine a time window for acquiring an uplink transmission resource based on a subframe for the receiver unit receiving the paging message;
acquire the uplink transmission resource at the time window; and
report user data in the uplink transmission resource by using a time advance value that is stored in the device and that corresponds to a current position value,
wherein when the uplink transmission resource is allocated to the device by a base station and the device is a Machine Type Communications (MTC) device, the processor determining the time window for acquiring the uplink transmission resource based on the subframe for the receiver unit receiving the paging message comprises determining that the time window for acquiring the uplink transmission resource is based on summing a subframe of the paging message or a subframe indicated by the paging message, a fixed offset, and a multiple of an index number of the MTC device in a paging list, wherein the multiple is a number of subframes spaced between uplink schedules of two MTC devices; or
wherein when the device is a device in a paging group, and the uplink transmission resource is allocated to the paging group by a base station, the processor determining the time window for acquiring the uplink transmission resource based on the subframe for the receiver unit receiving the paging message comprises identifying a time window after a fixed interval as the time window for acquiring the uplink transmission resource; or
wherein the processor determining the time window for acquiring the uplink transmission resource, comprises: determining, by the processor, a start position of the time window for acquiring the uplink transmission resource; wherein the device is an MTC device; wherein the start position of the time window is based on summing a subframe of the paging message or a subframe indicated by the paging message, a fixed offset, and a size of the time window multiplied by an index number of the MTC device in an paging list; and wherein the uplink transmission resource is an uplink transmission resource allocated to the MTC device by a base station.

7. The device according to claim 6, wherein the processor is further configured to judge whether a position change of the device after a time advance value has elapsed exceeds a predetermined threshold;
the device further comprising:
a transmitter unit, configured to: when the position change of the device after the time advance value has elapsed does not exceed the predetermined threshold, report the user data in the uplink transmission resource, by using the time advance value that is stored in the device and that corresponds to the current position value.

8. The device according to claim 7, wherein judging whether a position change of the device after a time advance value has elapsed exceeds a predetermined threshold, comprises:

calculating a boundary of a downlink subframe according to a clock set by the device;

obtaining a deviation by comparing an boundary of the downlink subframe actually acquired by the device with the calculated boundary of the downlink subframe according to the clock set by the device; and calculating whether the position change of the device exceeds the predetermined threshold according to the deviation.

* * * * *

UNITED STATES PATENT AND TRADEMARK OFFICE
CERTIFICATE OF CORRECTION

| | | |
|---|---|---|
| PATENT NO. | : 9,210,705 B2 | Page 1 of 1 |
| APPLICATION NO. | : 14/012628 | |
| DATED | : December 8, 2015 | |
| INVENTOR(S) | : Huang et al. | |

It is certified that error appears in the above-identified patent and that said Letters Patent is hereby corrected as shown below:

In the claims

Column 10, line 45, claim 1, "unlink" should read -- uplink --.

Column 10, line 57, claim 1, "aquiring" should read -- acquiring --.

Signed and Sealed this
Twenty-ninth Day of March, 2016

Michelle K. Lee
*Director of the United States Patent and Trademark Office*